United States Patent [19]

Zhao

[11] Patent Number: 6,035,404
[45] Date of Patent: Mar. 7, 2000

[54] CONCURRENT USER ACCESS CONTROL IN STATELESS NETWORK COMPUTING SERVICE SYSTEM

[75] Inventor: Yan Zhao, Fulton, Md.

[73] Assignee: International Business Machines Corporation, Armonk, N.Y.

[21] Appl. No.: 08/926,207

[22] Filed: Sep. 9, 1997

[51] Int. Cl.[7] .................................................. G06F 17/40
[52] U.S. Cl. ........................................ 713/201; 709/225
[58] Field of Search ........................... 395/187.01, 186, 395/200.55, 188.01; 713/200, 201, 202; 709/225, 227, 228, 229, 224

[56] References Cited

U.S. PATENT DOCUMENTS

| | | | |
|---|---|---|---|
| 5,513,337 | 4/1996 | Gillespie et al. | 713/200 |
| 5,555,376 | 9/1996 | Theimer et al. | 709/229 |
| 5,559,933 | 9/1996 | Boswell | 395/114 |
| 5,717,604 | 2/1998 | Wiggins | 395/187.01 |
| 5,832,212 | 11/1998 | Cragun et al. | 713/202 |
| 5,845,070 | 12/1998 | Ikudome | 395/187.01 |

FOREIGN PATENT DOCUMENTS 2-137038  4/1990  Japan ............................ G06F 12/00
11-66081  3/1999  Japan ............................ G06F 17/30

*Primary Examiner*—Robert W. Beausoliel, Jr.
*Assistant Examiner*—Christopher A. Revak
*Attorney, Agent, or Firm*—Karl O. Hesse

[57] ABSTRACT

System and method for managing user logins to a restricted computer service over a stateless network. Single user and multiple, or concurrent, user accounts can be maintained with this logging system. Users are assigned a data mask and an internal user ID (IUID). During a login attempt, the mask is used to scan a user login map to determine if the login will be permitted. For single users, the login is allowed if a current session is not already in progress, as indicated by the login map. For concurrent users, the login is allowed if the maximum number of concurrent users for the account does not already exist, as indicated by the login map. When a login is not allowed, a current session may be terminated or set to be terminated after a fixed interval of time, thereby allowing the requested login. A state lookup table (SLT) is maintained to temporarily keep track of each session in progress and includes a session identifier, the IUID, the starting time, and any termination time established for the session.

8 Claims, 5 Drawing Sheets

| Session ID | IUID | Start Time | Time Out |
|---|---|---|---|
| 0001002 | 10002 | 960826024030 | 960826064030 |
| 0010000 | 10002 | 960826044030 | |
| 0100231 | 0 | 960826054050 | |
| 0100459 | 10034 | 960826064050 | |

CONCURRENT USER ACCESS CONTROL IN STATELESS NETWORK COMPUTING SERVICE SYSTEM

BACKGROUND OF THE INVENTION

1. Field of the Invention

This invention relates, in general, to online computer systems and, more specifically, to access control of concurrent or multiple users using the same account or master ID number.

2. Description of the Prior Art

Online access to a computer or host system is becoming more commonplace with the passage of time, partly because of the availability of several publicly oriented computer access networks, and the Internet. This changing of the way people can get information has created a new field of commerce, i. e., electronic publishing. Whereas materials were traditionally published in hard copy format, there has become a need to make materials available on computer readable media, such as a CD-ROM. Now, much interest is being expressed for online publishing. For example, when a person wants to peruse a certain technical reference book, he might simply log onto the Internet and view the contents of the publication on the video monitor. In some cases, hard copy printouts may be made for appropriate text or graphic portions of the document or book from the online session.

One of the problems associated with this type of publication distribution is the ability to fairly and properly charge the user for using the information. A desirable method would be to charge the user for the ability to access this material, which is much like the charges made when the material is distributed in hard copy or CD-ROM format. This is not very difficult for a single user, i. e., one who has a separate account with the publisher. The user simply registers to use the information and agrees to pay the agreed compensation. With this type of arrangement, no limit is usually placed upon the access time, thus the user is free to peruse the materials as long as he wants. The difficulty comes in when the situation of a concurrent user, or one that gains access simultaneously under a common account, uses the system. Such may be the case at educational institutions and large companies. The institution or company may simply want to have a master account which would allow simultaneous access to the materials by a maximum number of online users, all authorized by the entity to view the publication. For example, a corporate account may allow anyone with proper access in the corporation to view online a particular publication, up to a maximum of twenty users concurrently, or simultaneously. That would be much like charging for selling to the corporation twenty copies of the book or document for unlimited use.

One of the difficulties in establishing this type of online publishing system is in properly permitting and controlling access to the system in a manner consistent with these objectives. This is especially true when dealing with a stateless network, like the Internet's World Wide Web (www), which does not maintain user states of logged in or logged out. In conventional host-based computer networking systems, logged in users and session states are maintained by the involved hosts. The system can control how many login users are allowed at any given time, and users log out when finished. But, when using the HTTP protocol, no user logout activity is supported. Consequently, it is desirable, and it is an object of this invention, to provide an access control system for concurrent users in a stateless network which is effective and usable in access applications which require specific accounting parameters, like online publishing. To this extent, it is also desirable, and a further object of this invention, to provide an access control system which can determine if additional concurrent user logins are permitted, when a user has logged out, and when a user can login if all the available login slots are currently being used.

SUMMARY OF THE INVENTION

There is disclosed herein a new and useful computer access control system for a stateless network which can keep track of concurrent users assigned to a common account or ID number, and which can also permit logins to single user accounts. The system includes a login manager and a state manager which monitor the status of the various areas and functions of the system. A user login map (ULM) is used to keep track of the number of users logged onto the system. In a preferred embodiment of the system, this map consists of a plurality of 32-bit wide binary words. Changing the value of the binary bits at a predefined position determines whether a specific user account is currently logged into. Single user accounts have one bit assigned to them, whereas multiple user (concurrent) accounts have a plurality of bits assigned to the area which holds the number of current logins.

A user attempting to log into the system enters a user ID and password in the usual manner. Once that is verified, the system obtains a user mask and an internal user ID (IUID) from the user's profile area. The mask is applied to the user login map to determine if the login will be permitted. If permitted, the IUID is entered into a state lookup table (SLT) along with other information about the logged in session.

The user mask defines the area in the user login map that must be checked to see if a login will be allowed. For a single account user, one bit in the login map is examined to see if there is already a login under that account, or same IUID. If so, access will be denied or, in some cases, a forced login may be initiated by the logging on user. If no present login is indicated, the user is logged on and the user login map is updated by setting the appropriate bit in the login map. For a concurrent or multiple account, more than one bit in the login map is examined to see if the maximum number of logins already exists. If not, the requested login is permitted and the user login map is updated by adding one to the binary value in the map.

If the maximum number of logins already exists, the system sets a time-out period for the session that has been in progress the longest. It also informs the logging in user of that time. After the expiration of that time, or if a concurrent user logs off before that time, the login for the requesting user is permitted.

A state lookup table (SLT) is used to keep track of the login sessions in progress. This table includes a session identifier, the IUID used to establish the session, a starting time for the session, and a "time out" time for the session if one has been established. Maintenance of the table is performed by the system login manager and by a state manager. This maintenance includes purging the table of terminated sessions and forcing logouts when a time-out entry has been equalled or exceeded.

BRIEF DESCRIPTION OF THE DRAWINGS

Further advantages and uses of this invention will become more apparent when considered in view of the following detailed description and drawings, in which.

DETAILED DESCRIPTION OF THE PREFERRED EMBODIMENTS

Figure 1:
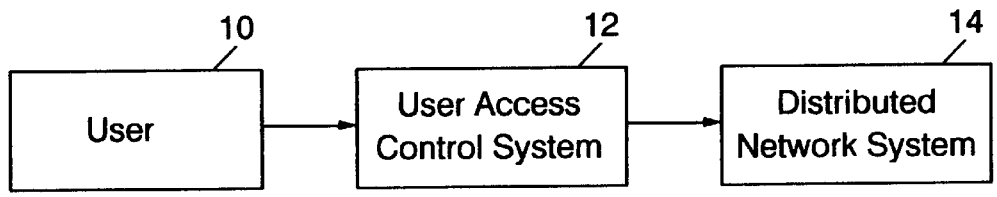
FIG. 1 is a block diagram of the environment in which the present invention functions.

Throughout the following description, similar reference characters refer to similar elements in all of the figures of the drawings.

Referring now to the drawings, and to FIG. 1 in particular, there is shown a block diagram of the environment in which the invention functions. The user 10 is attempting to gain access to the distributed network system 14 through the user access control system 12. The distributed network system 14 could be any of a number of online systems, such as an online publishing system or other Internet web page controlled application. The network is a stateless network which does not need to keep track of logins and logouts, such as the Internet's World wide Web (www) which is based on the HTTP protocol. The control system 12 interfaces between the user 10 and the system 14 to govern the access and to make sure that the access is proper and within the strict rules set out by the owner of the application program to be run over the system. It is emphasized here that the control system 12 is mainly interested in establishing and ending logins, not in providing an accounting or log of activity for billing purposes. If that is desired, it can be done by other means commonly know in the prior art.

Figure 2:
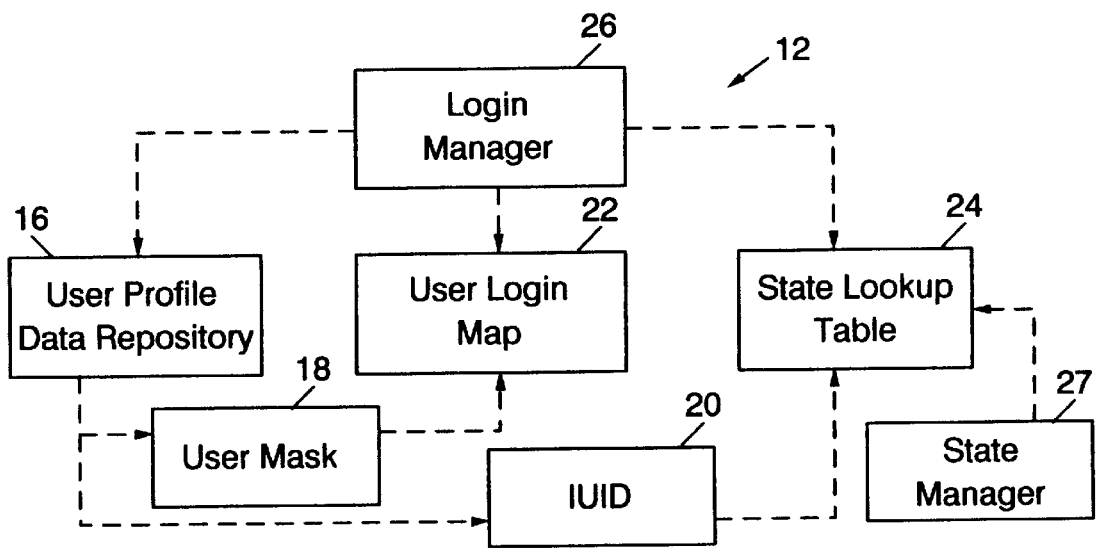
FIG. 2 is a block diagram illustrating the major components of the invention in an approximate flow path relationship.

FIG. 2 shows the major components of the control system 12 of FIG. 1. The user profile data 16 contains essential login information on a particular individual user. Normally, this information would include the usual user ID and password much like conventional user access control systems. This information would be stored in the data repository 16 during user initial registration or by a system operator. Once access is gained in the normal manner by the user ID and password, additional information in the user profile data repository 16 is retrieved for use by the login system. As illustrated, a user mask 18 and an internal user ID (IUID) are a part of the user profile and are used to further determine the access rights of the user. The mask 18 and the IUID 20 are also placed in the user profile data repository 16 automatically after initial user registration, or manually placed therein by a system operator or administrator.

Figure 3:
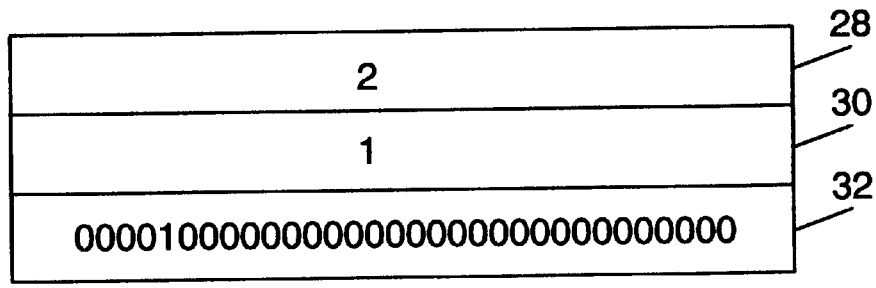
FIG. 3 is a representation of a single user mask as used in this invention.
Figure 4:
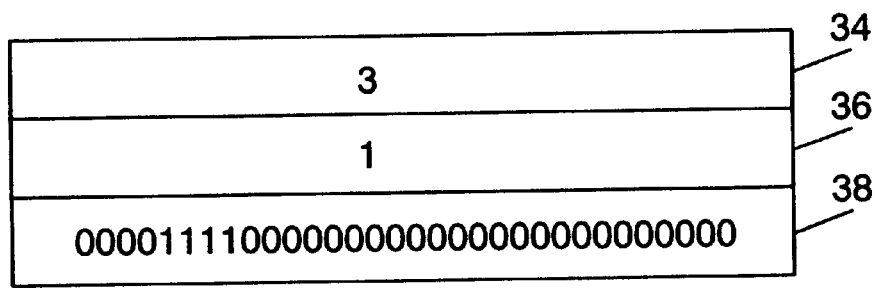
FIG. 4 is a representation of a concurrent user mask as used in this invention.
Figures 6, 9:
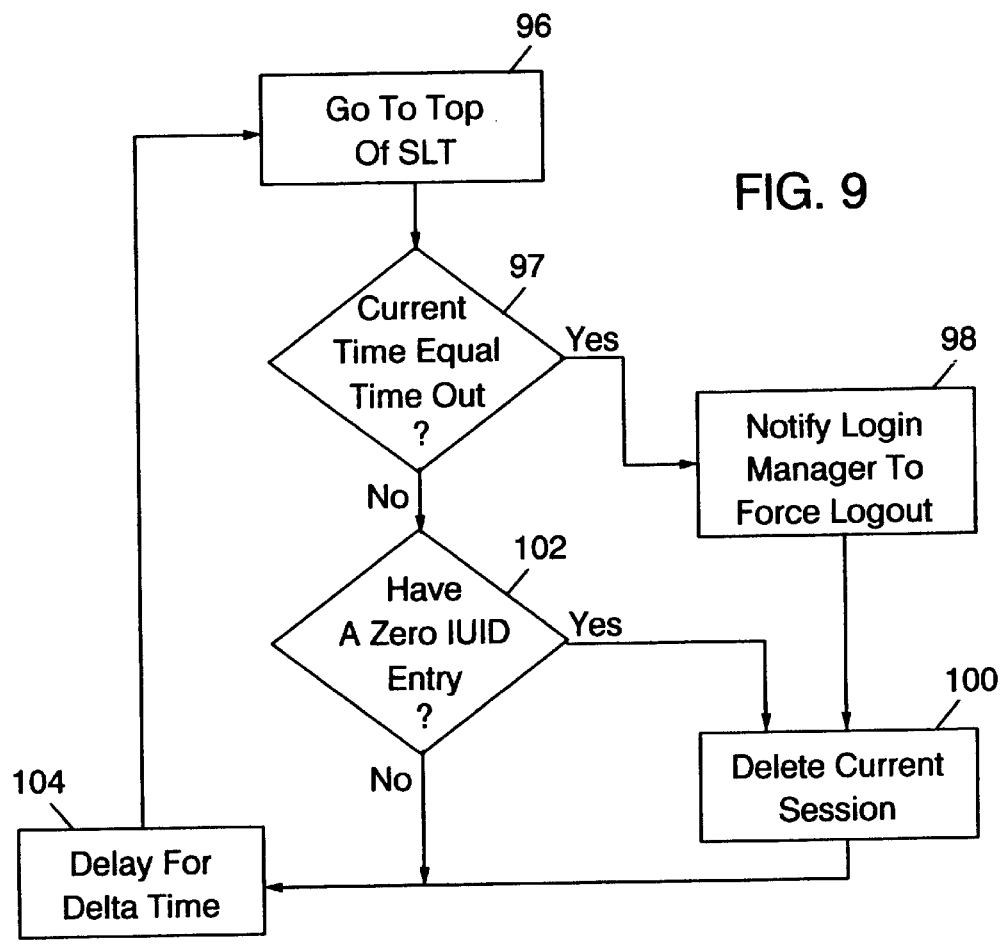
FIG. 6 is a representation of a state lookup table (SLT) as used in this invention.
FIG. 9 is a flow chart illustrating additional access control system functions performed by the state manager according to a specific embodiment of this invention.

The mask 18, as will be further described in conjunction with FIGS. 3 and 4, is for use in scanning the data in the user login map (ULM) 22. This scanning will determine if the login will be permitted. The IUID 20, as will be described further in conjunction with FIG. 6, is for state keeping during user navigation of the service facility (i. e. web pages), and for use in recording session data in the state lookup table (SLT) 24. The table 24 is used, among other things, to determine if a particular concurrent user will be forced off to make way for a new login. All of this is under the control of the login manager 26 with multiple computation methods. The SLT 24 is created by the login manager 26 at system initialization and is maintained by a state manager 27, as will be described in more detail later herein.

FIG. 3 illustrates a mask typical of that used for a single user. Although the present invention allows for the orderly access of concurrent users, single users who have access only one at a time are also processed by the system. The single user mask in FIG. 3 includes data which can define or indicate three parameters. The first parameter is the location of the area in the user login map 22 which will be looked at by the mask. The mask area 28 shows a value of 2, meaning that the second word in the user login map 22 will be used. More detail about the user login map and the application of the mask data will be described in conjunction with FIG. 5.

The mask area 30 shows a value of 1, meaning that the mask works on one word in the login map 22. The mask area 32 is the remainder of an unsigned integer array representing the actual mask that will be applied to the login map 22 in the areas indicated by the areas 28 and 30. As shown here, area or mask 32 is a 32-bit binary word having the 5th most significant bit as 1. All single user masks will have only one bit in the mask equal to 1. The 1 signifies the bit in the login map which must be set or reset to show the login status of the user.

FIG. 4 illustrates a mask typical of that used for a concurrent user. The value of 3 in the mask area 34 indicates that the 3rd word in the login map 22 will be the start of the mask comparison and, according to the area 36 value of 1, only one word will be compared. Since the number of concurrent users a system may permit may exceed one word, the value of area 36 may be larger than 1 in those cases. The ones in the 5th through 8th most significant bits indicate that those four bits are the areas in the login map that will contain the status of 15 users who are allowed for current login with the same master login ID, or IUID. In both the single user and concurrent user masks, the size of the word containing the bits can be other than 32, as shown herein, without departing from the teachings of the invention.

Figure 5:
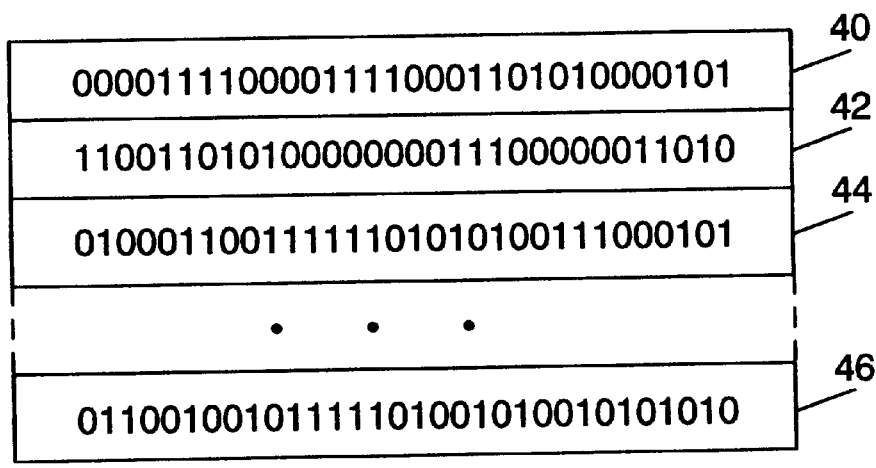
FIG. 5 is a representation of a user login map (ULM) as used in this invention.

FIG. 5 illustrates a specific valued and structured user login map being used in this embodiment for the login map 22 shown in FIG. 2. According to FIG. 5, the login map is an unsigned long integer array with W×N bits, where W is the word length in bits (32) and N is the number of words in the map. Only four 32-bit words (40, 42, 44 and 46) are shown, although more or less words and bits per word are within the scope of this invention. The ones in the map indicate the number of current or present logins. For single user ID's, just one bit is used and it indicates that there is no login if zero or that there is a login if one. For concurrent user ID's, more than one bit is used to define the number of present logins for that IUID, with the number being a binary weighted value using all the bits for that IUID. For example, one word would allow $2^w-1$ users.

As an example, the single user mask shown in FIG. 3 is compared to the login map values shown in FIG. 5. Referring to both Figures, area 28 indicates that the second word of the map will be the starting place for the comparison, and area 30 indicates that one word will be compared. Area 32 indicates the actual mask to be compared with the defined word area in the map. Consequently, word 42 will be masked by the bits in area 32. The 1 in area 32 is matched with a 1 in area 42 at the 5th most significant bit position. This tells the login manger that a login is already present for that user IUID, and normally access would be denied. As will be described later, a procedure for forced login is included in the system. If the bit under consideration in the area 42 is 0 at the time of attempted login, a login would be permitted and the bit set to 1 by the login manager.

As another example, the concurrent user mask shown in FIG. 4 is compared to the login map values shown in FIG. 5. Referring to both Figures, area 34 indicates that the third word of the map will be the starting place for the comparison, and area 36 indicates that one word will be compared. Area 38 indicates the actual mask to be compared with the defined word in the map. Consequently, word 44 will be masked by the bits in area 38. The ones in area 38 are matched with a 0110 in area 44 at the 5th through 8th most significant bit positions. This tells the login manger that six logins are already present for that user account. The 4-bit representation is weighted in binary fashion to calculate the 6 users ($2^2+2^1$). Since a value (0) needs to be used to indicate no users, the total number of users that can be represented by the 4-bit number is 15. Consequently, $2^{32}-1$ can be represented by the complete word and, as stated before, more than one word can be used to represent concurrent users in the login map. Any number of bits greater than 1 can be used for defining the total number of concurrent users permitted to be logged on at the same time. If another login is permitted, the login manager increments or adds one to the binary value in area 44, which would result in the bits 0111 at the same positions used in this example. Therefore, the size of the mask for the user determines whether he has single user or concurrent user access rights and, in the case of a concurrent user, how many users may be logged on at the same time.

FIG. 6 illustrates details of the state lookup table 24 shown generally in FIG. 2. When a user attempts a logon, the state lookup table is used for various functions, such as recording session ID's, active users, and determining the status of logins already in progress. The table, in this embodiment, is a portion of memory in a computer system which is allocated, in run time, to holding this particular information. Each session, which is established after a user login, has an entry created in the table. A session ID 48 is generated dynamically for a session. It may be a numerical value which increases (to a maximum limit) and rotates for each session allowed on the system. A coded value reflective of such things as the user's level of access or date/time logged on, or any other value which can distinguish one session from another.

The internal user ID (IUID) for the session is also entered into the state lookup table. The IUID is obtained from the user profile data in the same manner as the user mask. Both are obtained when the user accomplishes the normal logging procedure, such as entering his own user ID and his password successfully. The user mask and IUID are normally the same for all users assigned to the same account and approved for the same concurrent login privileges. This is true even though each individual user has a separate individual user login ID and password. The internal user ID (IUID) also is of the same form and bit size for all users, thereby facilitating the allocation of memory for its storage in the table. In FIG. 6, the IUID's are all five-digit decimal values.

The starting time for a session is entered under the heading Start Time 52. If there is a logout time mandated by the system, the time is specified under the heading Time Out 54. Times may be actual as shown (year-month-day-hour-minute-second) or a delta or difference from a known time. When a session is in progress, the IUID is present in the table. When a user logs out, the IUID is set to zero, as shown for the 3rd session illustrated. Periodically, the state manager 27 checks the table and purges the 0 IUID sessions which have been logged out. If the maximum concurrent user number is reached, the login manager 26 can set mandatory time out times for the earliest started session having the same IUID. The state manager 27 monitors to see when those times are reached and then removes them from the SLT. In general, the login manager performs the tasks of setting an IUID to 0 and setting a time for time-out in the SLT. The state manager 27 generally performs the tasks of cleaning up the 0 IUID and time out entries in the SLT.

The first two sessions in the state lookup table of FIG. 6 indicate that two concurrent users have logged onto the system. Note that the IUID's are the same for these two sessions. Note also that session 0001002 is set to be limited to a time out of not beyond a specified time, whereas session 0010000 has not been given a time-out time. Forced time-out times can be derived from several circumstances. It can be from the level of access permitted for the individual user, the need to limit a concurrent user's time to allow for another user to logon, or from other circumstances. Session 0100231 has already been logged out, and session 0100459 is currently in progress without a required ending time. Therefore, both do not have time-out times indicated for their session. Session 0100459 is either a single user session or one user of a concurrent user IUID. The state lookup table in FIG. 6 permits the system of this invention to manage the distribution of the account between all those authorized users in such a manner that equitable use of a limited facility can be had by all those authorized to use the system, especially when more than the permitted number of users are trying to use the system at the same time.

Figure 7:
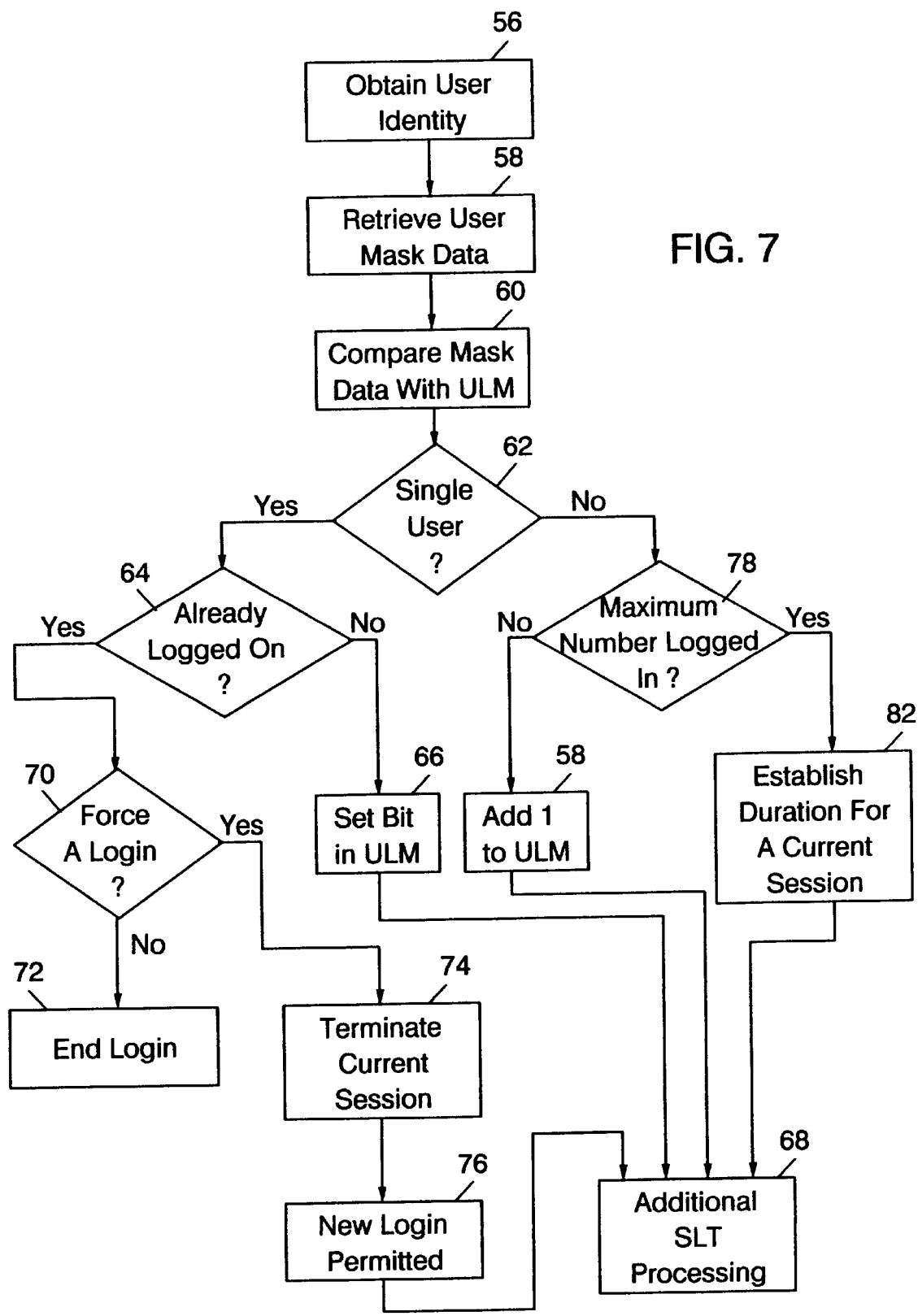
FIG. 7 is a flow chart illustrating how the access control system functions according to a specific embodiment of this invention.

FIG. 7 illustrates, in flow chart form, how the user access control system manages the login and session activities according to a specific embodiment of the invention. The first step is to obtain the user identity 56. From the normal user ID and password given at the start of the login, the system next retrieves the user mask data 58 which includes the internal user ID (IUID) and the user mask. The mask data is then compared (block 60) to the user login map (ULM) to determine the current login status. A determination is made from the mask if the user attempting a login is a single User (block 62). As previously indicated, a single 1 bit in the mask indicates a single user, whereas more than one 1 bit indicates a concurrent user.

Assuming that the user is found to be a single user, process flow continues to block 64 where it is determined whether that slot is already being used. That is, whether the one available login allowed for that user's IUID is already in progress. If there is no current login, the bit in the user login map corresponding to the 1 bit in the mask is set to 1, as indicated by block 66, and the login is permitted. Flow control then proceeds to block 68 for additional state lookup table (SLT) processing.

If the comparison in block 64 indicates that the available slot (a logged in session) is already in progress, the user attempting to login is asked if a forced login should be attempted, as indicated in block 70. Such communication between the access control system and the user attempting login can be by conventional methods, such as the sending of appropriate web pages to the user for response when the system is operating in the Internet environment. If a forced login is not requested, the login attempt is ended (block 72). If the forced login is requested, the login manager 27 terminates the current session (block 74). According to the configuration of the system, there can be several different ways to accomplish this result. In one case, the current user could be logged out immediately and the new login allowed. In another case, the current user could be given a time limit for logging off and notified of the time left, after which the new user would be logged on. The time to wait for logging on in this case could be conveyed to the user waiting to logon. Once the new login is permitted (block 76), the ULM would be updated and flow control proceeds to block 68 for additional state lookup table (SLT) processing.

If the user is found to be a concurrent user in block 62, the system next determines from the mask data if the maximum number of simultaneous logins are existing at the present time (block 78). If not, 1 is added to the user login map (block 80), the login is permitted, and flow control proceeds to block 68 for additional processing. If the maximum number of logins already exists, then the state lookup table (SLT) is consulted to determine which session for the same concurrent user IUID has been established for the longest time. That session is then given a termination or "time out" time (block 82) and that information is entered into the SLT. Flow control then proceeds to block 68 for additional processing. As in the case of the single user forced login situation, the concurrent user here may be advised of the time left for the current session to be timed out, thereby indicating to the logging in user the maximum time he needs to wait until he can get access to the system.

Figure 8A:
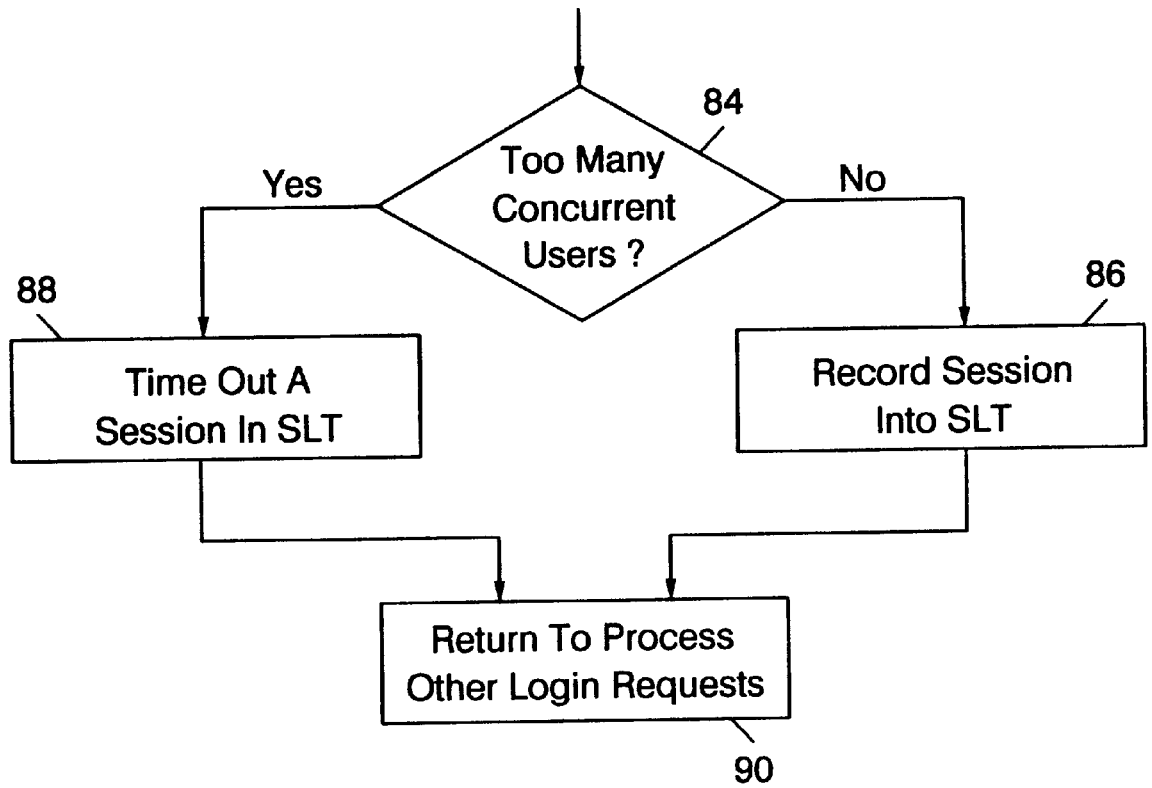
FIG. 8a is a flow chart illustrating additional access control system functions performed during login by the login manager.
Figure 8B:
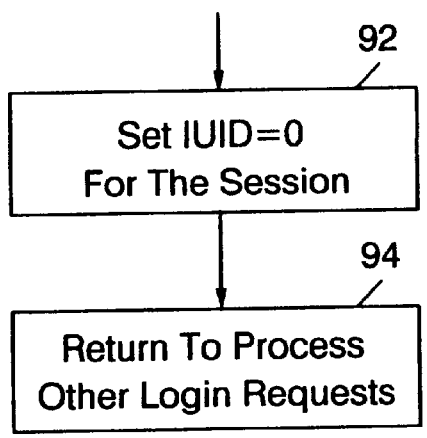
FIG. 8b is a flow chart illustrating additional access control system functions performed during logout by the login manager.

FIGS. 8a and 8b illustrate the additional processing accomplished by the login manager 26 with respect to the SLT. For a login, FIG. 8a shows that a determination is made (block 84) whether there are too many concurrent users already logged on. (This determination is the same as accomplished in block 78 of FIG. 7 and may not be a new determination.) If not, the session is recorded into the SLT as indicated in block 86. If there are too many concurrent users, a session in the SLT is timed out (block 88). Normally, this would be the session that has the earliest starting time. After performing the indicated function, the login manager 26 returns to process other login requests (block 90). For a logout, FIG. 8b shows that the login manager 26 sets the IUID equal to 0 for the recorded session (block 92) in the SLT. Then, the login manager 26 returns to process other login requests (block 94).

FIG. 9 illustrates the additional processing accomplished by the state manager 27. This processing is mostly of a management nature to keep the state lookup table (SLT) 24 up-to-date and to effect any actions that the current status of the table dictates. Beginning at the top of the SLT (block 96), the state manager 27 determines if the session is to be terminated because it has equaled or exceeded the allowed session time, or "time out" time (block 97). If so, the login manager 26 is notified to force a logout (block 98) and the session is deleted (block 100) from the SLT. When there does not need to be a forced logout, the state manager 27 looks at the session entry in the SLT and determines whether it is a terminated session which is still recorded in the table (block 102). Such a condition is indicated by a zero IUID recorded in a session. If such is the case, the session in the SLT is deleted (block 100) and process flow continues to block 104. If there are no sessions to delete, block 100 is bypassed and process flow continues directly to block 104. After a delay for a time "delta" (block 104), the state manager returns to the top of the SLT to go through the process again. In some cases, the delta time may be essentially zero. The mechanics of this process may take several different forms to scan all of the session entries. For example, all entries may be looked at on each pass, or the state manager may process a single session and then go down the list on a next scan, until all of the sessions in the SLT have been scanned for any required action by the state manager.

It is emphasized that numerous changes may be made in the above-described embodiments without departing from the teachings of the invention. For example, the system may not only be used with an online login procedure involving the world wide web on the Internet, but may also be used with inhouse or local computer networks that are setup to keep track of a maximum number of concurrent users allowed to access the system at the same time. Also, the system described herein may be useful in allowing access to a restricted machine or entry system which needs to limit concurrent access to a fixed number of users.

It is intended that all of the matter contained in the foregoing description, or shown in the accompanying drawings, shall be interpreted as illustrative rather than limiting.

Having thus described the invention, what is claimed is:

1. Apparatus for the control of user access over a stateless network to a restricted system which permits simultaneous access by concurrent users, said apparatus comprising:

means for assigning an internal user ID to each user;

mapping means for recording the number of current logins, the mapping means being in the form of a user login map which contains a plurality of binary words, with each of said binary words containing a plurality of binary bits, and wherein one or more of said binary bits in the same word are indicative of the number of current logins for a particular internal user ID;

validating means for determining if a requested login is permitted; and logging means for temporarily keeping a record of each access session in progress wherein only one bit of a word is used to indicate the current status for a single user internal user ID.

2. Apparatus for the control of user access over a stateless network to a restricted system which permits simultaneous access by concurrent users, said apparatus comprising:

means for assigning an internal user ID to each user;

mapping means for recording the number of current logins, the mapping means being in the form of a user login map which contains a plurality of binary words, with each of said binary words containing a plurality of binary bits, and wherein one or more of said binary bits in the same word are indicative of the number of current logins for a particular internal user ID, and wherein a bit group containing a plurality of bits of the same word are used to indicate the current number of logins for a particular concurrent user internal user ID, with said number being determined by weighting individual bits in the group;

validating means for determining if a requested login is permitted; and logging means for temporarily keeping a record of each access session in progress.

3. The control apparatus of claim 2 wherein a word has thirty-two bits.

4. Apparatus for the control of user access over a stateless network to a restricted system which permits simultaneous access by concurrent users, said apparatus comprising:

mapping means for recording the number of current logins;

means for assigning an internal user ID to each user;

validating means for determining if a requested login is permitted, the validating means including a user mask of binary bits for determining the current logins as recorded in the mapping means, and wherein the validating means also includes number and location identifiers about the words in the mapping means which will be compared with the user mask to determine the current logins; and logging means for temporarily keeping a record of each access session in progress.

5. A method of controlling user access over a stateless network to a restricted system which permits simultaneous access by concurrent users, said method including the steps of:

assigning an internal user identification (IUID) to each user;

maintaining a user login map which is indicative of the number of current logins for a particular IUID, wherein the user login map contains a plurality of binary words, with each of said binary words containing a plurality of binary bits, and wherein one of said binary bits of a word is used to indicate the current status for a single user IUID;

providing a user mask of binary bits for use with said login map;

comparing said user mask with said login map to determine if a login will be permitted; and authorizing the login if said comparison indicates that the maximum number of logins allowed for said IUID will not be exceeded by said authorizing.

6. A method of controlling user access over a stateless network to a restricted system which permits simultaneous access by concurrent users, said method including the steps of:

assigning an internal user identification (IUID) to each user;

maintaining a user login map which is indicative of the number of current logins for a particular IUID, wherein the user login map contains a plurality of binary words, with each of said binary words having a bit group containing a plurality of bits that are used to indicate the current number of logins for a particular concurrent user IUID, said number being determined by weighting individual bits in the group;

providing a user mask of binary bits for use with said login map;

comparing said user mask with said login map to determine if a login will be permitted; and authorizing the login if said comparison indicates that the maximum number of logins allowed for said IUID will not be exceeded by said authorizing.

7. A method of controlling user access over a stateless network to a restricted system which permits simultaneous access by concurrent users, said method including the steps of:

assigning an internal user identification (IUID) to each user;

maintaining a user login map which is indicative of the number of current logins for a particular IUID, wherein the user login map contains a plurality of binary words, with each of said binary words containing a plurality of binary bits, and wherein one or more of said binary bits in the same word are indicative of the number of current logins for a particular IUID;

providing a user mask of binary bits for use with said login map, the user mask including number and location identifiers about the words in the user login map which will be compared with the user mask to determine the current logins;

comparing said user mask with said login map to determine if a login will be permitted; and authorizing the login if said comparison indicates that the maximum number of logins allowed for said IUID will not be exceeded by said authorizing.

8. A method of controlling user access over a stateless network to a restricted computing service system which permits simultaneous access by concurrent users, said method including the steps of:

assigning an internal user identification (IUID) to each user;

maintaining a user login map (ULM) which is indicative of the number of current logins for a particular IUID, said login map including a plurality of binary words, with each of said binary words containing a plurality of binary bits, and wherein one or more of said binary bits in the same word are indicative of the number of current logins for a particular IUID;

providing a user mask of binary bits for use with said login map, with the user mask including number and location identifiers about the words in the user login map (ULM) which will be compared with the user mask to determine the number of current logins, said user mask defining the bits in said user login map which indicate the number of current logins for a particular IUID;

comparing said user mask with said login map to determine if a login will be permitted;

authorizing the login if said comparison indicates that the maximum number of logins allowed for that IUID will not be exceeded by said authorizing;

updating the user login map (ULM) when a user login is authorized, said updating resulting in the user login map (ULM) then being indicative of the new number of users presently logged on;

temporarily logging particulars about each session in progress in a state lookup table (SLT), with said particulars including at least a session ID, the staring time of the session, the IUID used to authorize the session, and any ending time established for the session; and establishing, when the maximum number is logged on, a time-out time for a current session and recording that time in said state lookup table.

* * * * *